Aug. 17, 1965 L. A. SHONTZ, JR., ETAL 3,200,923
AUTOMATIC RENTAL OR PURCHASE MONEY COLLECTION
APPARATUS FOR VENDING MACHINES
Filed May 20, 1963 2 Sheets-Sheet 1

INVENTORS.
Loran Allen Shontz Jr.
Elmer Bradley Offutt
BY Charley W. Hunter

Hovey, Schmidt, Johnson & Hovey,
ATTORNEYS.

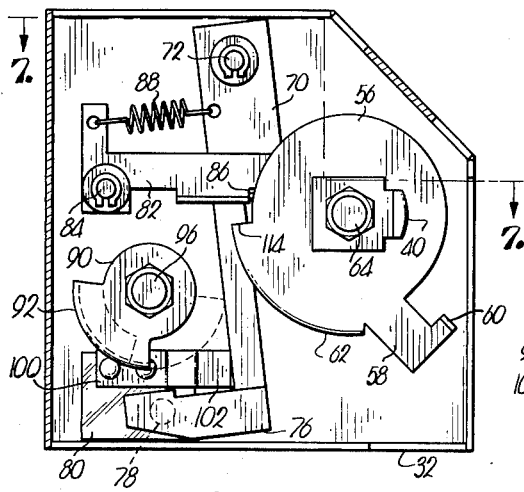
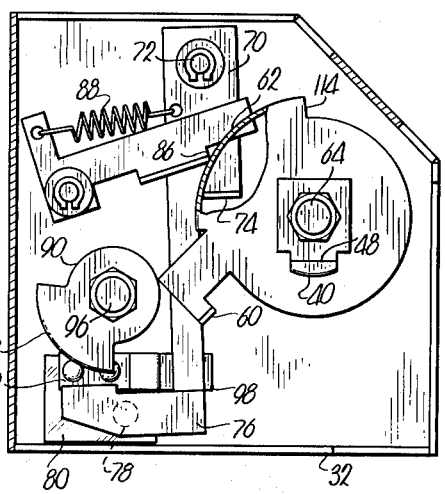
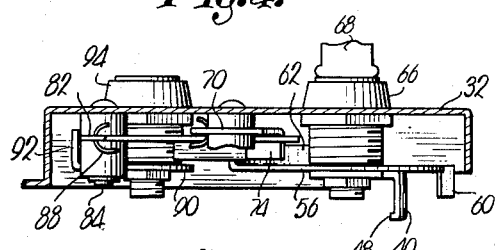
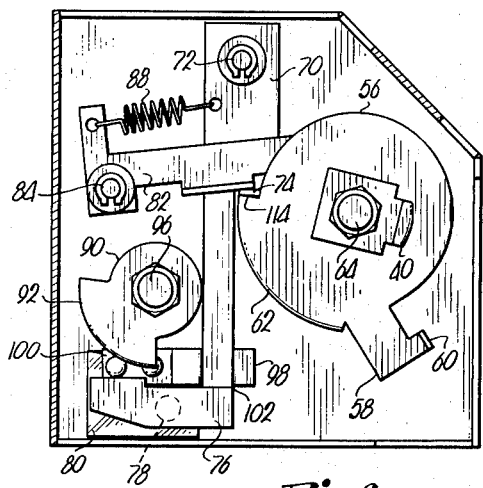
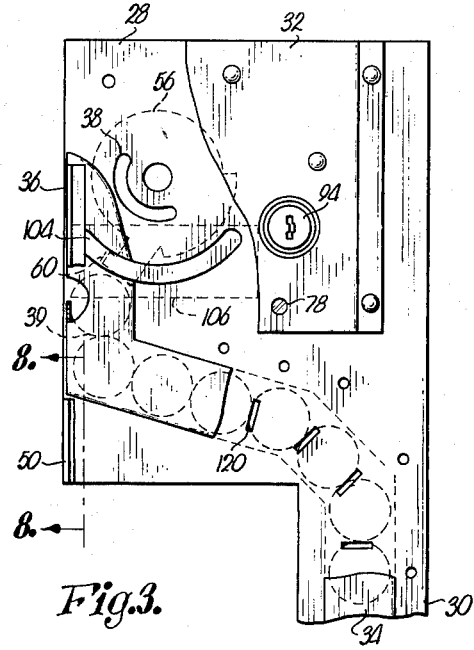
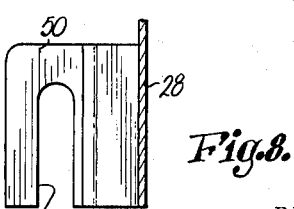

United States Patent Office 3,200,923
Patented Aug. 17, 1965

3,200,923
AUTOMATIC RENTAL OR PURCHASE MONEY COLLECTION APPARATUS FOR VENDING MACHINES
Loran Allan Shontz, Jr., Kansas City, Elmer Bradley Offutt, Independence, and Charley W. Hunter, Raytown, Mo., assignors to The Vendo Company, Kansas City, Mo., a corporation of Missouri
Filed May 20, 1963, Ser. No. 281,634
5 Claims. (Cl. 194—1)

This invention relates generally to automatic coin collection apparatus and, more specifically, to apparatus for placement on a vending machine to receive a predetermined amount of coinage and deny the location owner of the machine access to the coinage to insure that the lessor of the machine will be able to collect rental or purchase money payments.

When a location owner or lessee has full access to vending machine receipts there is frequently an inclination for the lessee to use the proceeds for the payment of incidental obligations without reserving from such proceeds the necessary funds to pay the rent on the machine or the regular payments on the purchase price thereof. Therefore, it is the primary object of this invention to provide apparatus for insuring that the location owner or lessee will reserve adequate funds for the rents or other payments due on the machine by denying the lessee access to such funds.

To this end, the instant invention provides key-operated lock means for releasably maintaining the coin collection device on the vending machine. The servant of the lessor, commonly known as a route man or collection agent, is provided with a key to the lock, thereby enabling removal of the apparatus from the vending machine only by the servant of the lessor. To further insure that such servant will not attempt to cheat the lessor by gaining entrance to the coin-receiving device and removing the coins therefrom, it is another object of this invention to provide means operable by the lock means for blocking the coin passage into the device when the apparatus is removed from the vending machine.

After removal of the apparatus the servant returns the same to the lessor's headquarters wherein removal of the coins therefrom is effected. To this end, it is a further and very important object of this invention to provide means whereby the lessor may remove the coins from the device conveniently without the necessity of partially disassembling the apparatus or removing any parts therefrom. This most important object is effected by providing a second key-operated means which permits the lessor to remove the coins from the device by merely inserting his key into the second key-operated means and actuating the same.

Further objects of the instant invention implementing the aforesaid important object include the provision of latch means for releasably locking the lock means in its released condition after actuation thereof by the route man, blocking means operably coupled with the lock means for obstructing the coin passage into the device to prevent removal of coins therefrom by way of said passage when the lock means is in its released condition, and means operable in response to actuation of the aforesaid second key-operated means for releasing said latch means to thereby enable the lessor to return the lock means (and hence the blocking means) to its locked condition which, in turn, removes the obstruction from the coin passage so that the lessor may gain access to the proceeds.

Another important object of the invention is to provide coin handling apparatus for a vending machine wherein a coin storage device is secured to structure defining an upright coin guiding channel leading from the coin receiving mechanism of the machine to an accessible coin collection area, with a preselected number of coins being diverted from the channel through a side opening communicating therewith, into the compartment of the coin storage device, whereby additional coins gravitating through the channel are diverted into the compartment and then deflected back into the channel by the last coin stored in the compartment so that by maintaining the coin storage device nonaccessible to persons having access to the coin collection area, the security of purchase or rental payments for the machine is assured for the owner thereof.

Other objects will become apparent as the detailed description proceeds.

In the drawings:

FIG. 3 is a frontal, fragmentary, detailed view of the instant invention with parts broken away for clarity;

FIG. 4 is a detailed view of the cover employed by the instant invention to mount and house the key-operated mechanisms and associated structure thereof, the cover being shown removed and the mechanisms being shown in positions subsequent to removal of the coins from the apparatus and preparatory to replacement of the apparatus on a vending machine;

FIG. 5 is a view similar to FIG. 4 except that the mechanisms therein are shown in their respective positions when the apparatus is locked in place on the vending machine;

FIG. 6 is a view similar to FIG. 4 except that the mechanisms are shown in their positions during unlocking of the apparatus and subsequent to the operation of the latch means;

FIG. 7 is a view taken along line 7—7 of FIG. 4;

FIG. 8 is a fragmentary, detailed view of a mounting tab and its stud-receiving slot taken along line 8—8 of FIG. 3;

Figure 1:
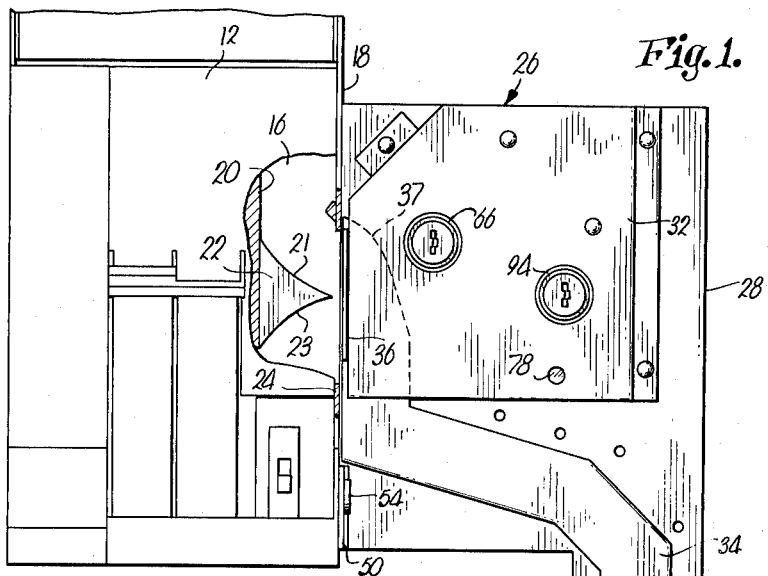
FIGURE 1 is a front view partially in section and partially in elevation showing the instant invention mounted in operative association with the coin changer of a vending machine.
Figure 2:
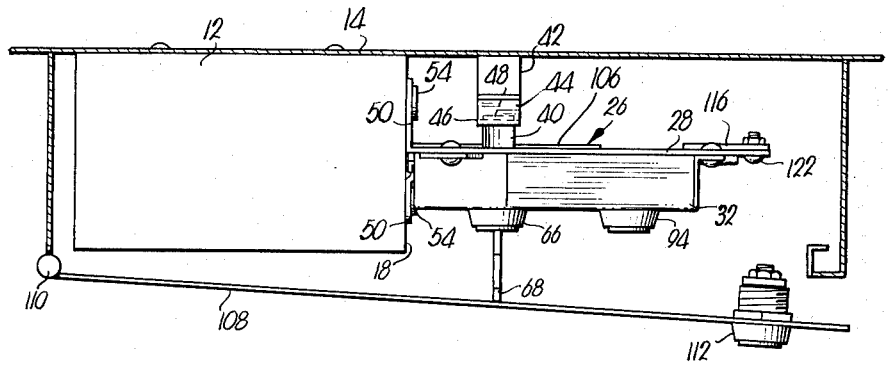
FIG. 2 is a top view of the invention and the coin changer housing shown mounted in the door or other support structure of the vending machine.

Referring first to FIGS. 1 and 2, the housing 12 of a coin changer is shown mounted on a support 14 which forms a part of a vending machine. The coin changer housing 12 has therewithin a plurality of coin channels, channel 16 thereof being of interest in the instant specification.

A wall 18 defines the right side of changer housing 12 as viewed in the figures, and further defines channel 16 along with an interior wall 20 of the changer. Within channel 16 a deflector 22 is disposed adjacent to and aligned with an aperture 24 in wall 18. Aperture 24 is in the form of a vertical slot somewhat greater in width than the thickness of the coins accommodated by channel 16 and having a length approximately twice the diameter of such coins.

It may be seen that a housing, generally designated 26, is shown attached to changer 12 and support 14. Housing 26 comprises a plate 28 having a normally vertically depending leg 30 and a cover 32. A coin chute 34 having an opening 36 for the passage of coins thereinto is mounted on plate 28 and extends into the leg 30 thereof. Chute 34 is of a thickness only slightly greater than the thickness of the coins to be accommodated therein so that such coins entering opening 36 will be disposed in the chute in edge-to-edge relationship.

Reference is now made to the figures in their entireties in order that the coupling of housing 26 with changer 12 and support 14 may be fully and accurately described. In FIG. 3 it may be seen that plate 28 has an arcuate slot 38 therein. Disregarding the mechanisms mounted to cover 32 for the moment in order to show the aforesaid coupling, a finger 40 extends through slot 38 and into operative association with an extension 42 of support 14. Extension 42 presents a concave upper surface 44 and is provided with a depending flange 46 which hooks over an upstanding flange 48 on finger 40. It may be seen that finger 40 is transversely arcuate to correspond approximately with the convexity of the undersurface opposing surface 44.

Plate 28 is provided at its left-hand margin as viewed in the figures, with a pair of laterally extending tabs 50. One of the tabs 50 is shown in detail in FIG. 8 wherein it may be seen that such tab has a vertical, stud-receiving mounting slot 52 therein. The mating studs for slots 52 are shown at 54 extending laterally from wall 18 of changer 12. Therefore, it may be appreciated that housing 26 is mounted to changer 12 and support 14 by engaging studs 54 with slots 52 and moving housing 26 downwardly with respect to the changer while finger 40 is out of alignment with extension 42, whereupon finger 40 may be swung into underlying relationship with extension 42 in a manner to be fully described hereinafter.

The various mechanisms contained within cover 32 and shown especially in FIGS. 4 to 7 will now be described. The lock means for the apparatus includes a rotatable device 56 in the form of a generally circular plate provided with a leg 58 having a laterally extending projection 60 integral therewith, and an arcuate guide or track 62. Finger 40 extends laterally outwardly from device 56 and is rigid therewith and spaced from the axis of rotation 64 of device 56. Key-operated means 66 is attached to cover 32 and extends therethrough for insertion of a key 68, the axis 64 of device 56 being integral with the axis of rotation of the internal mechanism of key-operated means 66 so that turning of key 68 rotates device 56.

A latch in the form of a generally vertically disposed member 70 swingable about pivot point 72 is provided with a follower 74 engageable with track 62. The lower end of member 70 is provided with a flag 76 visible through a hole 78 in cover 32 for purposes to be hereinafter described. Hole 78 is covered by a transparent material 80 rigidly secured to cover 32.

A cocking arm 82 pivots about point 84 and is cutaway at 86 to form a notch for engagement with follower 74 of member 70 when the components of the apparatus are in the positions shown in FIG. 4. Arm 82 and member 70 are interconnected by spring 88 which biases member 70 toward the left-hand position shown in FIG. 6 and biases arm 82 toward the horizontal position shown in FIG. 4.

A rotatable element 90 having an arcuate flange 92 integral therewith is mounted on key-operated means 94 for swinging movement about axis 96. Means 94 is for operation by the insertion of a key therewithin which rotates the internal mechanism of means 94 about axis 96 to, in turn, rotate element 90. Key-operated means 94 is mounted on cover 32 and extends therethrough in like manner as for key-operated means 66.

A strip 98 of spring steel is riveted to cover 32 at its left end 100 and defines a channel 102 which receives and yieldably holds member 70 when the latter is in the position as shown in FIG. 6. The purpose of strip 98 is to maintain member 70 against accidental movement from the position shown in FIG. 6 due to vibration, jarring, or impacts of any sort. It will be appreciated when the operation of the apparatus is described hereinafter that member 70 is dislodged from channel 102 by the action of element 90 when the latter is rotated to the dotted line position shown in FIG. 4 wherein flange 92 depresses strip 98 and engages member 70 to move the latter.

Referring to FIG. 3, it may be seen that an arcuate channel 104 is formed in plate 28 by cutting an arcuate slot therethrough and then welding or otherwise securing a small, rectangular plate 106 (shown in dotted lines) to the backside of plate 28. Channel 104 receives projection 60 when cover 32 is in place on plate 28. The relationship of rotatable device 56 and projection 60 to channel 104 and slot 38 is illustrated by the dotted lines appropriately referenced in FIG. 3. It may be appreciated from the forgoing that the arcuate channel 104 cooperates with projection 60 of the rotatable device 56 to permit the projection to block opening 36 when device 56 is rotated by key-operated means 66 during removal of the apparatus from changer 12 and support 14.

Before the operation of the apparatus within housing 26 is fully described, the alteration made in the coin channel 16 should be noted and fully appreciated. In vending machines presently manufactured that do not as yet employ the instant invention, deflector 22 is not present in channel 16 and thus the coins passing along channel 16 traverse a path of travel through the machine that is unobstructed or unaltered by means such as deflector 22. However, with deflector 22 disposed in the channel, coins passing vertically downwardly therealong are deflected by the upper surface 21 of deflector 22 and are thus directed through aperture 24 and into opening 36 of chute 34. A coin so directed by surface 21 is then directed by the curved edge 37 of chute 34 downwardly into the chute to fill the latter.

Referring to FIG. 3, it may be seen that after a predetermined number of coins have entered chute 34, the chute will be filled and the last coin 39 entering the chute will be disposed as shown. Subesequent coins entering the chute will strike the upper edge of coin 39 and bounce back through opening 36 and aperture 24. Such rebounding coins strike the lower surface 23 of deflector 22 and are thus deflected downwardly along channel 16. Hence, after chute 34 is filled, all subsequent coins traverse channel 16 in the normal manner except for the diversion around deflector 22.

In the operation of the apparatus it will be assumed that the route man or collection agent of the lessor desires to remove the apparatus from the vending machine so that it may be transported to the lessor's counting house for removal of the coinage therefrom. In this regard, FIG. 2 illustrates a hollow door of a vending machine wherein the changer 12 and the apparatus of the instant invention is mounted or, alternatively, FIG. 2 may be taken as illustrative of the housing of the vending machine proper wherein support 14 forms an exterior wall thereof. In either event, it is necessary that a panel 108 swingably mounted on a hinge 110 be opened by operating a lock 112. When lock 112 is released, panel 108 may be swung open and the route man thereby given access to the apparatus.

The insertion of key 68 into key-operated means 66 and the rotation of such key therewithin effects swinging movement of finger 40 due to the corresponding rotation of device 56. After finger 40 has been sufficiently displaced so as to no longer underlie extension 42, the apparatus may be removed by lifting upwardly thereon to disengage slots 52 from studs 54.

FIGURES 5 and 6 illustrate the movement of the internal mechanisms of the apparatus during the removal operation just described. In FIG. 5, finger 40 is shown in its lowermost position wherein it underlies extension 42. In this position it may be noted that follower 74 is engaged with and rides upon the inner surface of track 62. Follower 74 will continue to ride on track 62 after the insertion of key 68 into the key-operated means 66 until device 56 is rotated in a counterclockwise direction as viewed in FIGS. 4–6 to the position shown in FIG. 6.

When the position shown in FIG. 6 is reached, track 62 has been moved to a point wherein follower 74 can no longer engage the track and is moved leftwardly as viewed in FIGS. 4–6 by the swinging of member 70 about pivot point 72 under the action of spring 88. Finger 40 now no longer underlies extension 42 and the apparatus may be removed from the vending machine as aforesaid. However, it should be noted that the leftward movement of member 70 has positioned follower 74 such that clockwise movement of device 56 by the turning of key 68 is prevented due to the engagement of the upper end 114 of track 62 with follower 74. Therefore, key 68 in the possession of the route man is incapable of returning finger 40 to the position shown in FIG. 5.

The significance of the action of member 70 may be readily appreciated when it is noted that projection 60 is disposed, when finger 40 no longer underlies extension 42, in the position illustrated in FIG. 3 wherein the passage of further coins into chute 34 or out of chute 34 through opening 36 is prohibited. The ultimate result is that the route man cannot remove the coins from the chute after he has removed the apparatus from the vending machine. Therefore, the route man places another coin collecting apparatus having an empty chute 34 on the machine and returns the collecting device with the full chute to the counting house.

At the counting house the lessor inserts his key into key-operated means 94 and rotates the key to effect movement of element 90 from the solid line position shown in FIGS. 4–6 to the dotted line position shown in FIG. 4. This depresses strip 98 and moves member 70 rightwardly to unlatch device 56, thus permitting device 56 to be rotated into the "locked" position shown in FIG. 5 upon turning of key 68 in key-operated means 66. In turn, this moves projection 60 rightwardly along channel 104 as viewed in FIG. 3 so that opening 36 is no longer obstructed. The lessor than removes the proceeds from the coin chute by tipping the apparatus to permit the coins to gravitate from the chute outwardly through the opening 36.

To prepare the unloaded apparatus for replacement on a vending machine during the next trip of the route man, the lessor again operates key-operated means 66 to move device 56 and finger 40 to the "unlocked" position shown in FIG. 4. Element 90 is then actuated by key-operated means 94 to swing member 70 a sufficient rightwardly to allow follower 74 to catch in notch 86. Device 56 is thus no longer latched by member 70 due to the holding action of arm 82 which is moved downwardly to place notch 86 in engaging relationship with follower 74 by the action of spring 88.

Since device 56 and its associated finger 40 are no longer latched in the unlocked position, the apparatus may be replaced on a vending machine and locked in place by key 68. When this is effected, however, the upper end 114 of track 62 engages arm 82 and forces the same upwardly as illustrated in FIG. 5. In this manner the holding means preventing operation of the latch (member 70) no longer prevents operation of the latch and, when finger 40 is subsequently unlocked from extension 42, member 70 will once again latch finger 40 and projection 60 in the unlocked position to prevent the route man from removing the collected coins from chute 34.

A spot of red paint may be placted on the side of flag 76 facing hole 78 so that, when viewed from the outside of cover 32, a red or warning indication will be given to the user of the apparatus when it is removed from the vending machine and latched in the unlocked position blocking opening 36. Particularly, this serves to tell the lessor that he must cock the latch by the operation of key-operated means 94 before the route man can replace the apparatus on a machine.

Figures 9, 10:
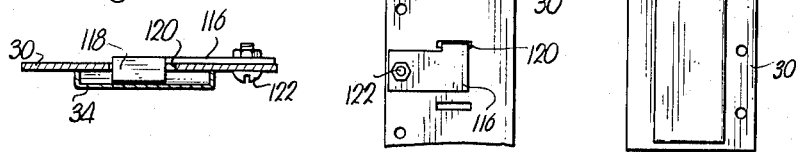
FIG. 9 is a view taken along line 9—9 of FIG. 1.
FIG. 10 is a fragmentary, elevational view of the means for adjusting the length of the chute to limit the coin capacity thereof to a predetermined number.

It may be noted in FIGS. 9 and 10 that means is provided for controlling the effective length of chute 34 so that the amount of coinage contained therein may be preset. To this end, a strip 116 is provided having a laterally extending tab 118 integral therewith and received by a corresponding slot 120 in the plate 28 or leg 30 thereof. It is evident that tab 118 blocks off that portion of the chute therebelow. Nut and bolt means 122 permits strip 116 to be located at any of a number of predetermined points along chute 34 having a slot 120.

Having thus described the invention, what is claimed as new and desired to be secured by Letters Patent is:

1. In coin collecting apparatus:
   a support;
   means for receiving and storing coins including structure defining an opening normally adapted for passage of coins therethrough;
   key-operated lock means for releasably locking said receiving and storing means upon said support;
   blocking means swingable between locations clearing and blocking said opening;
   means operably coupling said blocking means with said lock means for disposing said blocking means in clearing relationship to said opening when said lock means is locked and in blocking relationship to said opening when said lock means is released;
   latch means shiftable between a pair of positions for latching said lock means in its released condition when said latch means is in one of said positions;
   means coupled with said latch means and yieldably biasing the latter toward said one position;
   key-operated shiftable means operably coupled with said latch means, when said key-operated means is shifted, for shifting said latch means to the other position; and
   releasable holding means for maintaining said latch means in said other position against the action of said biasing means when said key-operated shiftable means is shifted, said key-operated lock means being operably coupled with said holding means as said lock means is restored from its released to its locked condition for releasing said holding means, said lock means including retaining means operably coupled with said latch means when said lock means is in its locked condition for maintaining said latch means in said other position after said holding means is released and until said lock means is next released.

2. The apparatus of claim 1, wherein said lock means includes a rotatable device provided with a finger extending therefrom toward said support when said receiving and storing means is locked upon the support, and includes means on said support disposed for locking engagement by said finger when the lock means is in its locked condition.

3. The apparatus of claim 1, wherein said retaining means comprises a track, and said latch means is provided with a follower for sliding engagement with the track.

4. The apparatus of claim 1, wherein said latch means includes a swingable member and said holding means includes a swingable arm for engagement with the member, said biasing means being coupled with said arm for yieldably biasing the latter toward a member-holding position wherein the arm is engaged with the member and said latch means is held in said other position.

5. In a coin operated machine having a support and structure defining a coin channel mounted on said support, said structure including a wall having an aperture extending therethrough communicating with the channel, said support being provided with an extension spaced from said wall, the combination with said extension of:
   a housing having a slot therein and provided with a coin chute having a coin-receiving opening at one end thereof;
   a rotatable device provided with a finger extending therefrom for engagement with said extension, said device being disposed in said housing with the finger extending through said slot, the slot being located on said housing to position the latter with said opening aligned with said aperture when said finger is engaged with said extension;

first key-operated means in said housing and coupled with said device for rotating the latter to swing said finger in said slot between a first position wherein said finger is in engagement with said extension and a second position wherein said finger is disengaged from said extension, said device being provided with a projection disposed for obstructing said opening when the finger is in said second position;

releasable means in said housing for engaging said device to maintain the latter against rotation by said first key-operated means when said finger is in said second position; and second key-operated means in said housing and including an element for movement into operative association with said releasable means to disengage the releasable means from said device, whereby the finger may be returned to said first position by the first key-operated means and the opening thereby rendered unobstructed.

References Cited by the Examiner

UNITED STATES PATENTS

| | | | |
|---|---|---|---|
| 2,585,718 | 2/52 | Adams et al. | 194—10 |
| 2,604,259 | 7/52 | Anderson | 232—15 |
| 2,783,937 | 3/57 | Hudson | 232—15 |
| 3,016,185 | 1/62 | Osborne | 232—15 |
| 3,083,896 | 4/63 | Cairelli | 232—15 |

SAMUEL F. COLEMAN, *Primary Examiner.*

ERNEST A. FALLER, JR., ROBERT B. REEVES, *Examiners.*